United States Patent [19]

Jackson

[11] Patent Number: 5,749,550
[45] Date of Patent: May 12, 1998

[54] APPLIANCE LEVELING SYSTEM ALLOWING ADJUSTMENT OF REAR SUPPORTS WITHOUT ACCESS TO REAR OF CABINET

[75] Inventor: Wade Lee Jackson, Louisville, Ky.

[73] Assignee: General Electric Company, Louisville, Ky.

[21] Appl. No.: 653,915

[22] Filed: May 28, 1996

[51] Int. Cl.⁶ ............................... F16M 11/24
[52] U.S. Cl. ...................... 248/188.2; 248/188.4; 248/649; 248/650; 248/677
[58] Field of Search ........................ 248/188.2, 188.3, 248/677, 649, 650, 188.4

[56] References Cited

U.S. PATENT DOCUMENTS

| | | |
|---|---|---|
| 1,032,970 | 7/1912 | Vanderveld . |
| 2,793,467 | 5/1957 | Matter . |
| 2,979,857 | 4/1961 | Longbotham . |
| 3,071,887 | 1/1963 | Von Arb . |
| 3,186,670 | 6/1965 | Perl . |
| 3,750,989 | 8/1973 | Bergeson . |
| 3,927,853 | 12/1975 | Guth . |
| 3,951,370 | 4/1976 | Tompkins . |
| 3,968,949 | 7/1976 | Romano, Jr. . |
| 4,124,187 | 11/1978 | Webb . |
| 4,192,564 | 3/1980 | Losert . |
| 4,518,142 | 5/1985 | Sulcek et al. . |
| 4,748,715 | 6/1988 | Rice . |
| 4,789,121 | 12/1988 | Gidseg et al. . |
| 4,932,729 | 6/1990 | Thompson et al. . |
| 4,955,569 | 9/1990 | Hottmann . |
| 4,991,805 | 2/1991 | Solak et al. . |
| 5,398,620 | 3/1995 | Rouch ........................ 248/188.2 X |

*Primary Examiner*—Robert W. Gibson, Jr.
*Assistant Examiner*—Donald J. Wallace
*Attorney, Agent, or Firm*—H. Neil Houser

[57] ABSTRACT

Adjustable rear leveling systems for refrigerators and other appliances are described. In one embodiment, the leveling system includes a rear rail having notch embossed pads. Rail leveling units are mounted to the rear rail at the pads. Each rail leveling unit, in the one embodiment, includes a rail bracket which mounts to the rear rail. Each leveling unit also includes a leveling link and a link arm. The leveling link is rotatably secured to the rail bracket by a first pin, and a leveling roller is engaged to the leveling link by a second pin. A first end of the link arm extends through a keyed opening in the leveling link and a second end of the link arm has a threaded opening extending therethrough. An adjusting screw extends through an opening in a front rail of the appliance, and a threaded portion of the adjusting screw extends through, and into threaded engagement with, the threaded opening in the second end of the link arm. By rotating the adjustment screw clockwise or counterclockwise, the adjusting screw moves the link arm toward or away from the rear rail. Such movement of the link arm causes the leveling link to rotate about the first pin, and such rotation causes the leveling roller to move toward or away from the rear rail. As the leveling roller moves toward the rear rail, the rear rail is adjusted upward. As the leveling roller moves away from the rear rail, the rear rail is adjusted downward.

20 Claims, 2 Drawing Sheets

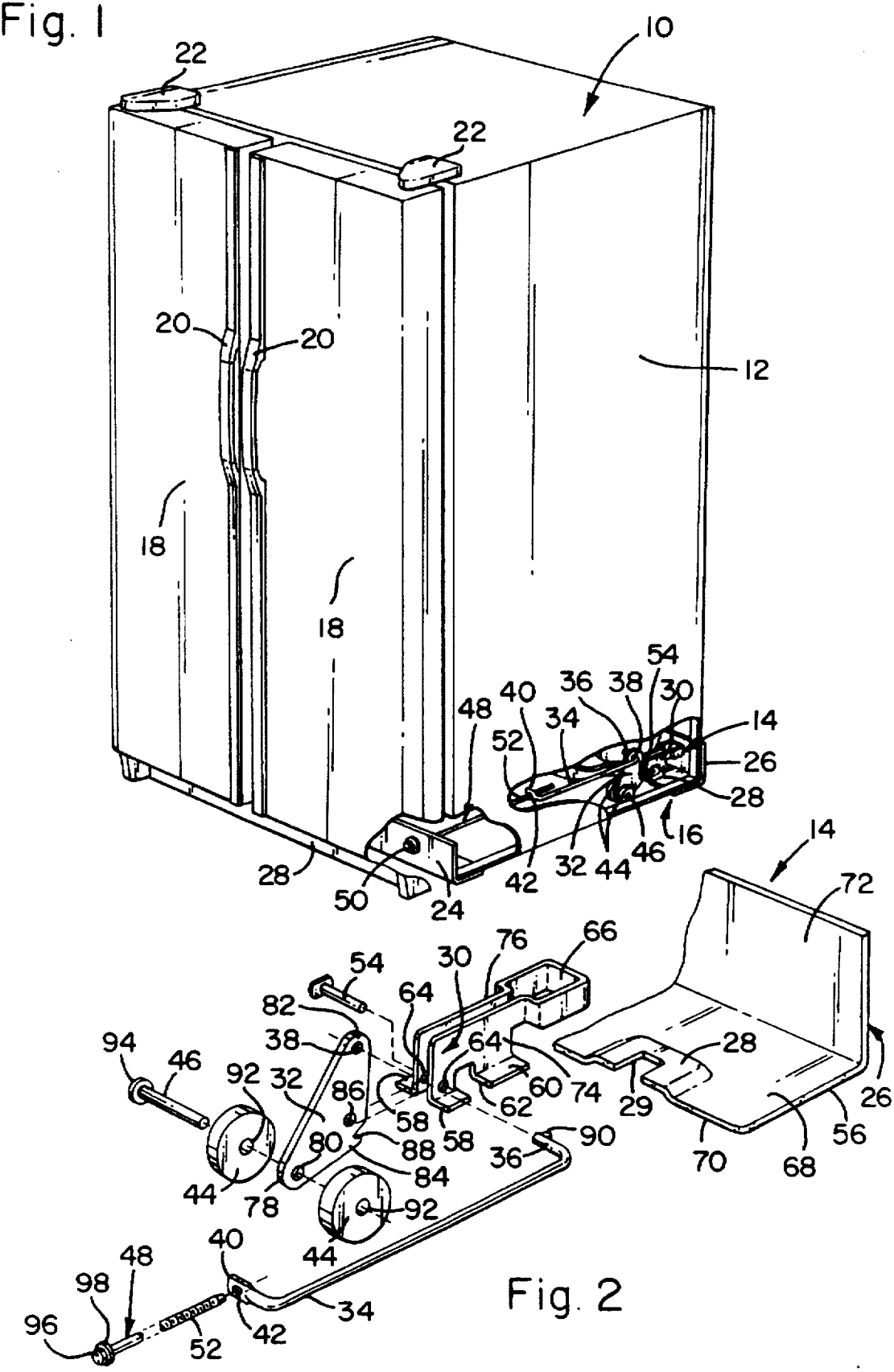

APPLIANCE LEVELING SYSTEM ALLOWING ADJUSTMENT OF REAR SUPPORTS WITHOUT ACCESS TO REAR OF CABINET

FIELD OF THE INVENTION

This invention relates generally to leveling systems for leveling cabinets and, more particularly, to independent leveling of rear cabinet corners of refrigerators and other appliances.

BACKGROUND OF THE INVENTION

Frequently, appliances such as refrigerators and washing machines are placed on sloping surfaces. Usually, manually adjustable supports are affixed to the front underside of an appliance cabinet. The supports are individually adjustable so that the supports can be employed for compensating for slope in a supporting surface from front to back and also for slope from side to side. The front supports must often be adjusted to unequal lengths to compensate for the side-to-side slope in the supporting surface. If the cabinet has two fixed rear supports, the cabinet may then rock on three of its four supports. In the case of an appliance such as a washing machine, this may result in undesirable "walking". Of potentially greater concern, the weight of the cabinet may cause twisting of the cabinet to bring all four supports into engagement with the supporting surface.

Such twisting is particularly of concern in a refrigerator cabinet. More specifically, when a normal amount of food is stored in a refrigerator cabinet, the cabinet is very heavy. Since a refrigerator cabinet is tall and not as rigid as more compact cabinets, e.g., a washing machine cabinet, a refrigerator cabinet has a greater tendency to twist when not supported on all the supports. This twisting action of the cabinet may cause distortion of the front face of the cabinet, and may prevent the refrigerator door from properly sealing its gasket with the cabinet front face. Without proper sealing, heat will leak into the refrigerator cooling compartment and result in inefficient refrigeration and waste of electrical energy. Moreover, in the case of refrigerator-freezers which have two doors, either one above the other or side by side, the twisting action may prevent the doors from lining up well enough to be aesthetically acceptable.

Further, since a refrigerator is heavy and is often placed in a confined area, it is difficult or impossible to provide access to the rear supports for adjusting such supports to compensate for a sloping surface. As explained above, however, adjusting such rear supports is important to better ensure efficient operation of a refrigerator and for aesthetic purposes. Therefore, it is important to adjust the rear supports of an appliance cabinet so that the cabinet may be uniformly supported, front and back, in an upright position, and to make such adjustment without requiring access to the rear of the cabinet.

Also, a leveling system for a refrigerator, in addition to being readily and easily adjustable, should not adversely affect the structural integrity of the refrigerator. For example, the leveling system should not weaken the front or rear rails of the cabinet support.

When performing leveling of an appliance, and in order to avoid damage to flooring, it typically is preferable to perform such levelling with rollers. Rollers, as compared to threaded studs, are believed to be less likely to damage flooring. The leveling system also preferably can be positioned flush with an underside of the cabinet support to facilitate preventing damage to the leveling system during shipping and handling.

SUMMARY OF THE INVENTION

These and other objects are attained by adjustable rear leveling systems for refrigerators and other appliances, including appliances which require independent leveling of the two rear cabinet corners after or during installation. In one embodiment, the leveling system includes a rear rail having a first end and a second end. A first notch embossed pad is located at the first rear rail end and a second notch embossed pad is located at the second rear rail end. A first rail leveling unit is mounted to the rear rail at the first pad, and a second rail leveling unit is mounted to the rear rail at the second pad.

The first and second rail leveling units, in the one embodiment, are identical, and each unit includes a rail bracket having a u-shaped cutout. The rail bracket also has flanged feet formed on opposite sides of the u-shaped cutout and opposed pivot pin openings. To secure the rail bracket to the rear rail, a rear pair of rail bracket flanged feet are positioned in substantial surface-to-surface contact with a top surface of the rear rail and a front pair of flanged feet are positioned in substantial surface-to-surface contact with a bottom surface of the rear rail.

The leveling units also each include, in the one embodiment, a leveling link having a substantially triangular shape. A first corner of the link has a first pin opening extending therethrough, a second corner of the link has a second keyed opening extending therethrough, and a third corner of the link has a third opening extending therethrough. The leveling link is rotatably secured to the rail bracket by a first pin that extends through the opposed pivot pin openings of the rail bracket and the leveling link third opening. A first end of a link arm extends through the keyed opening in the leveling link, and a leveling roller having an opening extending therethrough is engaged to the leveling link by a second pin that extends through the leveling roller opening and the first pin opening in the leveling link.

An adjusting screw having a head and a threaded portion extends through an opening in a front rail of the appliance, and the adjusting screw threaded portion extends through, and into threaded engagement with, a threaded opening in a second end of the link arm. In addition to the front rail, a typical appliance includes a mobility plate, and adjustable front rollers are mounted to the mobility plate.

In accordance with the embodiment of the leveling system described above, the leveling rollers are adjustable independently of the front rollers mounted to the appliance mobility plate. Specifically, and with respect to each leveling unit, by rotating the respective adjustment screw clockwise or counterclockwise, the adjustment screw moves the link arm toward or away from the rear rail. Such movement of the link arm causes the leveling link to rotate about its pivot point, i.e., the center axis of the first pin, and such rotation of the leveling link causes the leveling roller to move rearwardly toward or forwardly away from the rear rail. As the leveling roller moves rearwardly toward the rear rail, the rear rail moves upward relative to the support surface. As the leveling roller moves forwardly away from the rear rail, the rear rail moves downward relative to the support surface.

The above described leveling system enables independent adjustment of the rear cabinet corners to compensate for a sloping surface, and such adjustment can be made without requiring access to the rear of the cabinet. Specifically, rear rail leveling can be performed from the front of the cabinet by simply rotating the adjusting screws. Such easy access facilitates adjusting the rear rail so that the cabinet may be uniformly supported, front and back, in an upright position.

Further, the above described leveling system does not substantially adversely affect the structural integrity of the refrigerator supports. The embossed pads do not substantially weaken the rear rail of the cabinet support, and the front rail is only structurally modified to include adjusting screw openings. Also, damage to flooring is avoided by using leveling rollers. Moreover, the leveling system rollers and other leveling system components also can be positioned flush with the underside of the cabinet support to reduce the likelihood of damage to the leveling system during shipping and handling.

BRIEF DESCRIPTION OF THE DRAWINGS

FIG. 1 is an elevated perspective view of a refrigerator including a cabinet partially cut-away to illustrate a leveling system in accordance with one embodiment of the present invention.

FIG. 2 is an exploded perspective view of a leveling unit in accordance with one embodiment of the present invention.

DETAILED DESCRIPTION OF THE DRAWINGS

Figure 4:
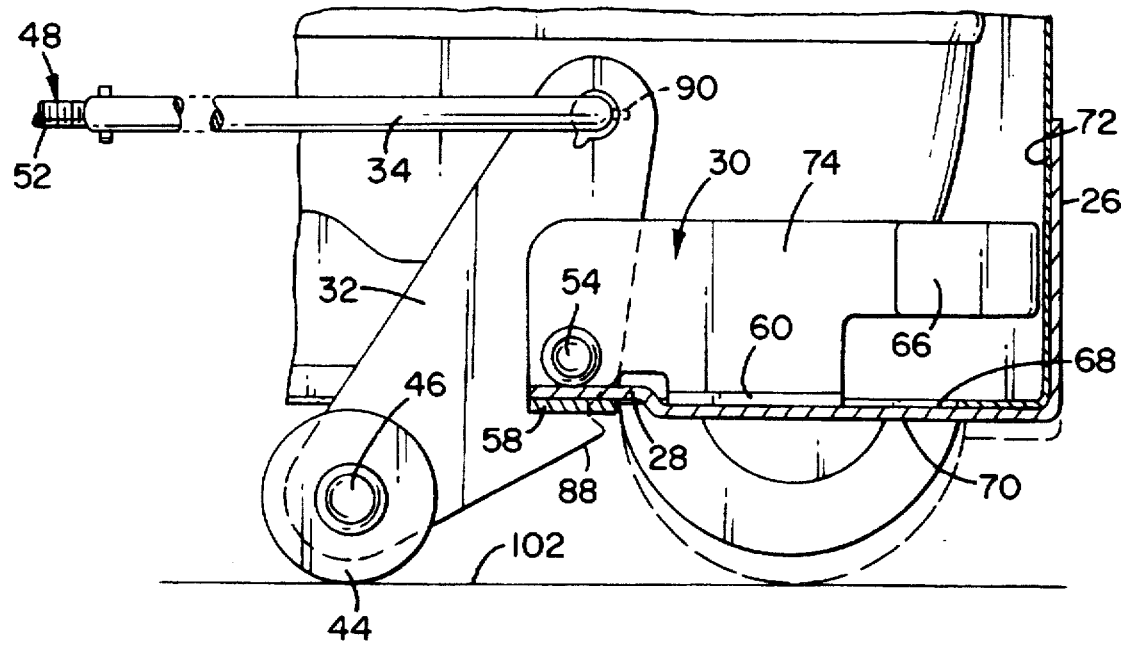
FIG. 4 is a cross section view of the leveling unit through line 4—4 shown in FIG. 3.

FIG. 1 is an elevated perspective view of a refrigerator 10 including a cabinet 12 partially cut-away to illustrate a leveling unit 14 of a leveling system 16 in accordance with one embodiment of the present invention. Pivotally mounted doors 18 are mounted to cabinet 12, and doors 18 include handles 20. Hinge covers 22 are provided to cover door hinge assemblies (not shown). Cabinet 12 is supported on a front rail 24 and a rear rail 26. A front grill 28 extends from cabinet 12 and primarily is provided for aesthetic purposes. Although not shown in FIG. 1, a mobility plate typically extends downward from front rail 24 and front rollers are mounted to the mobility plate. The front rollers are adjustable relative to the mobility plate to facilitate leveling cabinet 12.

As explained above, the cabinet 12 is very heavy when a normal amount of food is stored therein. In addition, since refrigerator cabinet 12 is tall, cabinet 12 has a tendency to twist when unevenly supported along the lengths of rails 24 and 26. This twisting action of cabinet 12 may cause distortion of cabinet 12, and this distortion may prevent refrigerator doors 18 from properly sealing with the front face of cabinet 12. Without proper sealing, heat will leak into the refrigerator cooling compartment and result in inefficient refrigeration and waste of electrical energy. Also, the twisting action may prevent doors 18 from lining up well enough to be aesthetically acceptable.

Further, since refrigerator 10 is heavy and may be placed in confined areas, it is difficult or impossible to provide access to rear rail 26 for adjustment. Such adjustment, however, is important to better ensure efficient operation of refrigerator 10 and for aesthetic purposes. Therefore, it is important to adjust rear rail 26 so that cabinet 12 may be uniformly supported, front and back, in an upright position, and to make such adjustment without requiring access to the rear of cabinet 12.

Leveling system 16, which is partially shown in FIG. 1, achieves these and other objects. Leveling system 16 includes two identical leveling units 14, only one of which is visible in FIG. 1. Each unit 14 is mounted to rear rail 26. One leveling unit 14 is engaged to rear rail 26 at a notch embossed pad 28, and another leveling unit (not shown) substantially identical to leveling unit 14 is engaged to the other end of rear rail 26 at another notch embossed pad (not shown) substantially identical to pad 28. These notch embossed pads 28 have a notch 29 formed therein. Rail leveling unit 14 includes a rail bracket 30 which mounts to rear rail 26. Leveling unit 14 also includes a leveling link 32 and a link arm 34. A first end 36 of link arm 34 extends through a keyed opening 38 in leveling link 32 and a second end 40 of link arm 34 has a threaded opening 42 extending therethrough. Leveling rollers 44 are engaged to leveling link 32 by a pin 46. An adjusting screw 48 extends through an opening 50 in front rail 24, and a threaded portion 52 of adjusting screw 48 extends through, and into threaded engagement with, threaded opening 42 in second end 40 of link arm 34. Leveling link 32 is rotatably attached to bracket 30 by a pin 54. Pins 46 and 54 may, for example, be riveting (has a head) or riveting roller (does not have a head) type pins, screw type pins, drive type pins, or stud type pins with outside retainers such as E-rings or "C" clips. Pins 46 and 54 are sometimes referred to herein functionally as leveling roller pin 46 and leveling link pin 54.

By rotating adjustment screw 48 clockwise or counterclockwise, link arm 34 moves toward or away from rear rail 26. Such movement of link arm 34 causes leveling link 32 to rotate about pin 54, and such rotation causes leveling rollers 44 to move rearwardly toward or forwardly away from rear rail 26. As leveling rollers 44 move rearwardly toward rear rail 26, rear rail 26 is adjusted upward, and as leveling rollers 44 move forwardly away from rear rail 26, rear rail 26 is adjusted downward.

FIG. 2 is an exploded perspective view of leveling unit 14 shown in FIG. 1. As shown in FIG. 2, embossed pad 28 is located at a first end 56 of rear rail 26. A second embossed pad (not shown) is located at a second end (not shown) of rail 26. The width and depth of embossed pad 28 are minimized and configured to receive rail bracket 30 as described hereinafter in detail. The height of pad 28 is selected so that a bottom surface of rail 26 is flush with surfaces of rail bracket 30 when rail bracket 30 is engaged to rail 26.

Rail bracket 30 has a front pair 58 and a rear pair 60 of flanged feet. A u-shaped cutout 62 is between front and rear feet 58 and 60. Opposed and aligned leveling link pin openings 64 extend through rail bracket 30. Rail bracket 30 is formed, in one embodiment, using a progressive die to form the plurality of bends in bracket 30. A return bend portion 66 is formed as a result of such progressive die forming operation.

To engage rail bracket 30 to rear rail 26, rear pair 60 of flanged feet are positioned in substantial surface-to-surface contact with a top surface 68 of rear rail 26 and front pair 58 of rail bracket flanged feet are positioned in substantial surface-to-surface contact with bottom surface 70 of rear rail. Flanged feet 58 and 60 are then mechanically clinched, or punched, to rear rail 26. A preferred direction of the mechanical punch is such that the punch is formed through lower rail surface 70 so that lower surface 70 is flush with front feet 58. Alternately, bracket 30 may, for example, be attached to rear rail 26 by riveting, screws or welding feet 60 to rail 26.

The depth of bracket 30 may be extended to vertical flange 72 of rear rail 26, and return bend portion 66 may be attached to vertical flange 72 by screws or riveting. The width, or space, between legs 74 and 76 of bracket 30 is selected to just receive leveling link 32 plus a small clearance. The height of bracket 30 is selected so that bracket 30 provides some lateral stability for leveling link 32.

Leveling unit 14 also includes leveling link 32 having a substantially triangular shape. Link 32 could, of course, have many other geometric shapes. A first corner 78 of link 32 has a first leveling roller pin opening 80 extending therethrough, a second corner 82 of link 32 has second keyed opening 38 extending therethrough, and a third corner 84 of link 32 has a third leveling link pin opening 86 extending therethrough. A stop tab 88 is located near third opening 86. Stop tab 88 rests against embossed pad 28 on rear rail 26 when link 32 is fully pivoted to a maximum vertical adjustment and thus stops link 32 from further pivoting toward rail 26.

Pin 54 attaches leveling link 32 to rail bracket 30. Specifically, pin 54 extends through aligned pin openings 64 in bracket 30 and through third opening 86 in leveling link 32 when link 32 is positioned between bracket legs 74 and 76 and third opening 86 is aligned with openings 64.

Unit 14 further includes link arm 34 having first and second ends 36 and 40. First hooked end 36 of link arm 34 extends through second keyed opening 38 in leveling link 32 and second hooked end 40 of link arm 34 has threaded opening 42 extending therethrough. Link arm first end 36 has an upset spline 90 which only fits through second keyed opening 38 in leveling link 32 at a specific, aligned orientation, and spline 90 serves as a retainer, or keeper, to keep link arm 34 engaged to leveling link 32. Second link arm end 40 is flattened. As described hereinafter in more detail, link arm 34 moves under the control of adjusting or rotating power screw 48, and in turn moves leveling link 32, which causes leveling link 32 to pivot thereby raising or lowering leveling rollers 44 relative to rail 26. The length of link arm 34 is selected in conjunction with the length of adjusting screw 48 and/or the desired engagement point of adjusting screw 48 and link arm 34.

Leveling rollers 44 have openings 92 extending therethrough and are engaged to leveling link 32 by pin 46 that extends through leveling roller openings 92 and first pin opening 80 in leveling link 32. Rollers 44, which may be plastic, have a minimum width to reduce the overall width of the roller-link-roller cross section. A spotface, or recess, (not shown) is located on one side of each roller 44 so that a head 94 of pin 46 can be flush to the outside sidewalls of rollers 44.

Adjusting screw 48 having a head 96 and threaded portion 52 extends through opening 50 in a front rail 24 (see FIG. 1) and threaded portion 52 extends through, and into threaded engagement with, threaded opening 42 in second end 40 of link arm 34. Adjusting screw 48 is sometimes referred to herein as the power screw. An E-ring groove 98 is located in screw 48 just beyond head 96 for retaining screw 48 to front rail 24. E-ring groove 98 keeps screw 48 from moving forward under a no load condition and when leveling system 16 is fully retracted.

Each component of leveling unit 14 described above may be constructed from stainless steel. As explained above, however, wheels 44 preferably are molded from plastic. Other materials of sufficient strength and resistance to rust and wear can also be used.

Figure 3:
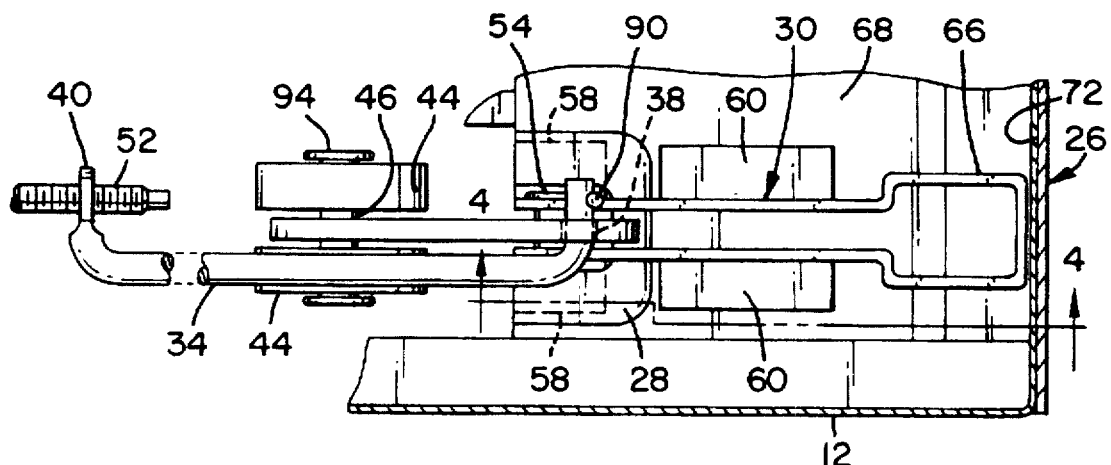
FIG. 3 is a top view of the assembled leveling unit shown in FIG. 2.

FIG. 3 is a top view of the assembled leveling unit 14 shown in FIG. 2. Rear feet 60 of rail bracket 30 transfer the vertical weight of cabinet 12 directly to rear rail 26 by surface bearing.

FIG. 4 is a cross section view of leveling unit 14 through line 4—4 shown in FIG. 3. With respect to adjusting leveling unit 14, by rotating adjustment screw 48 clockwise or counterclockwise, link arm 34 moves toward or away from rear rail 26. Such movement of link arm 34 causes leveling link 32 to rotate about pin 54, and such rotation causes leveling rollers 44 to move rearwardly toward or forwardly away from rear rail 26. As leveling rollers 44 move rearwardly toward rear rail 26, rear rail 26 is adjusted upward relative to support surface 102, and as leveling rollers 44 move forwardly away from rear rail 26, rear rail 26 is adjusted downward relative to surface 102. The other leveling unit (not shown) of leveling system 16 (FIG. 1) can be adjusted in a manner identical to the adjustment of leveling unit 14.

In accordance with the embodiment of leveling system 16 described above, leveling rollers 44 of leveling units 14 are adjustable independently of the front rollers mounted to the mobility plate (not shown). In addition, leveling, system 16 enables adjustment of rear rail 26 to compensate for a sloping surface. Such adjustment can be made without requiring access to the rear of cabinet 12. Specifically, rear rail leveling can be performed from the front of cabinet 12 using system 16. Such easy access facilitates adjusting rear rail 26 so that cabinet 12 is uniformly supported, front and back, in an upright position.

Further, leveling system 16 does not substantially adversely affect the structural integrity of refrigerator support rails 24 and 26. Embossed pads 28 do not substantially weaken rear rail 26, and front rail 24 is only modified to include adjusting screw openings 50. Also, damage to flooring is avoided by using leveling rollers 44. Rollers 44 and other leveling system components also can be positioned flush with the underside of rear rail 26 to facilitate avoiding damage to leveling system 16 during shipping and handling.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A leveling system for leveling an appliance, the appliance including a support having a rear rail with at least one notch pad formed thereon and a front rail having an adjusting screw opening extending therethrough, said leveling system comprising:

a rail bracket comprising a u-shaped cutout, said rail bracket comprising a rear pair of flanged feet and a front pair of flanged feet, and a pin opening, said rail bracket configured to be engaged to the rear rail at the one notch pad;

a leveling link having a substantially triangular shape, a first corner of said link having a first opening extending therethrough, a second corner of said link having a second opening extending therethrough, and a third corner of said link having a third opening extending therethrough;

a link arm having first and second ends, said first end of said link arm extending through said second opening in said leveling link, said second end of said link arm having a threaded opening extending therethrough;

an adjusting screw comprising a head and a threaded portion, said screw configured to extend through the opening in the front rail and said threaded portion extending through and in threaded engagement with said threaded opening in said second end of said link arm;

at least one leveling roller having an opening extending therethrough;

a first pin extending through said opening in said leveling roller and said first opening in said leveling link; and a second pin extending through said pin opening in said rail bracket and through said third opening in said leveling link.

2. A leveling system in accordance with claim 1 wherein the rear rail has a top surface and a bottom surface, said rear pair of flanged feet of said rail bracket configured to be positioned in substantial surface-to-surface contact with the top surface of the rear rail and said front pair of flanged feet of said rail bracket configured to be positioned in substantial surface-to-surface contact with the bottom surface of the rear rail.

3. A leveling system in accordance with claim 1 wherein the rear rail has a first end and a second end, the one notch pad located at the rear rail first end and another notch pad located at the rear rail second end, and said leveling system comprising another rail bracket configured to be engaged to the rear rail at the notched pad located at the rear rail second end.

4. A leveling system for leveling an appliance, said leveling system comprising:

a rear railing having a first end and a second end, a first pad located at said first rear rail end and a second pad located at said second rear rail end, said rear rail having a top surface and a bottom surface;

a front rail having first and second adjusting screw openings extending therethrough;

a first rail leveling unit mounted to said rear rail at said first pad, said first rail leveling unit comprising a rail bracket comprising a rear pair of flanged feet and a front pair of flanged feet, said front pair of flanged feet of said first rail leveling unit positioned in substantial surface-to-surface contact with said bottom surface of said rear rail and said rear pair of flanged feet of said first rail leveling unit positioned in substantial surface-to-surface contact with said top surface of said rear rail; and a second rail leveling unit mounted to said rear rail at said second pad.

5. A leveling system in accordance with claim 4 wherein each of said first and second pads are an embossed pad having a notch therein.

6. A leveling system in accordance with claim 4 wherein said rail bracket of said first leveling unit comprises a pin opening, and said first rail leveling unit further comprises:

a leveling link comprising a first opening extending therethrough, a second pin opening extending therethrough, and a third pin opening extending therethrough;

a link arm having first and second ends, said first end of said link arm extending through said second pin opening in said leveling link, said second end of said link arm having a threaded opening extending therethrough;

an adjusting screw comprising a head and a threaded portion, said screw extending through said first opening in said front rail and said threaded portion extending through and in threaded engagement with said threaded opening in said second end of said link arm;

at least one leveling roller having an opening extending therethrough;

a first pin extending through said opening in said leveling roller and said first opening in said leveling link; and a second pin extending through said pin opening in said rail bracket and through said third pin opening in said leveling link.

7. A leveling system in accordance with claim 6 wherein said rail bracket of said second rail leveling unit comprises a rear pair of flanged feet and a front pair of flanged feet on opposite sides of a u-shaped cutout.

8. A leveling system in accordance with claim 7 wherein each of said first and second pads on said rear rail has a notch therein, said front pair of flanged feet of said second rail leveling unit positioned in substantial surface-to-surface contact with said bottom surface of said rear rail and said rear pair of flanged feet of said second rail leveling unit positioned in substantial surface-to-surface contact with said top surface of said rear rail.

9. A leveling system in accordance with claim 6 wherein said leveling link has a substantially triangular shape, said first opening located at a first corner of said leveling link, said second pin opening located at a second corner of said leveling link, and said third pin opening located at a third corner of said leveling link.

10. A leveling system in accordance with claim 4 wherein said second rail leveling unit comprises:

a rail bracket comprising a u-shaped cutout, flanged feet formed on opposite sides of said u-shaped cutout, and a pin opening;

a leveling link having a substantially triangular shape, a first corner of said link having a first opening extending therethrough, a second corner of said link having a second opening extending therethrough, and a third corner of said link having a third opening extending therethrough;

a link arm having first and second ends, said first end of said link arm extending through said second opening in said leveling link, said second end of said link arm having a threaded opening extending therethrough;

an adjusting screw comprising a head and a threaded portion, said screw extending through said second opening in said front rail and said threaded portion extending through and in threaded engagement with said threaded opening in said second end of said link arm;

at least one leveling roller having an opening extending therethrough;

a first pin extending through said leveling roller opening and said first opening in said leveling link; and a second pin extending through said pin opening in said rail bracket and through said third pin opening in said leveling link.

11. A leveling unit for attaching to a rear rail of an appliance, the rear rail having top and bottom surfaces and at least one notch pad formed thereon, the appliance further including a front rail having an adjusting screw opening extending therethrough, said leveling unit comprising:

a rail bracket configured to engage the top and bottom surfaces of the rear rail at the one notch pad so that said rail bracket does not move relative to the rear rail, said rail bracket having at least one leveling link pin opening extending therethrough;

a leveling link having a leveling roller pin opening extending therethrough and a leveling link pin opening extending therethrough, said leveling link pin opening configured to be aligned with said leveling link pin opening of said rail bracket; and a leveling link pin configured to extend through said leveling link pin opening of said leveling link and said leveling link pin opening of said rail bracket to rotatably engage said leveling link to said rail bracket.

12. A leveling unit in accordance with claim 11 wherein said rail bracket further comprises a u-shaped cutout, and flanged feet formed on opposite sides of said u-shaped cutout.

13. A leveling unit in accordance with claim 12 wherein the rear rail has a top surface and a bottom surface, and said rail bracket comprises a rear pair of flanged feet and a front pair of flanged feet on opposite sides of said u-shaped cutout, said rear pair of flanged feet configured to be positioned in substantial surface-to-surface contact with the top surface of the rear rail and said front pair of flanged feet configured to be positioned in substantial surface-to-surface contact with the bottom surface of the rear rail.

14. A leveling unit in accordance with claim 11 wherein said leveling link has a substantially triangular shape.

15. A leveling unit in accordance with claim 11 further comprising:

a link arm having first and second ends, said first end of said link arm engaged to said leveling link; and an adjusting screw comprising a head and a threaded portion, said screw configured to extend through the opening in the front rail and said threaded portion extending through and in threaded engagement with said link arm.

16. A leveling unit in accordance with claim 11 further comprising:

at least one leveling roller having an opening extending therethrough; and a leveling roller pin extending through said opening in said leveling roller and said leveling roller pin opening in said leveling link.

17. A leveling unit in accordance with claim 16 wherein at least one of said first and second pins is a riveting type pin.

18. A leveling unit in accordance with claim 16 wherein at least one of said leveling link and leveling roller pins is a riveting roller type pin.

19. A leveling unit in accordance with claim 16 wherein said leveling link further comprises a stop tab.

20. A leveling unit in accordance with claim 16 further comprising:

two leveling rollers, each of said leveling rollers having an opening extending therethrough; and a leveling roller pin extending through said opening in each of said leveling rollers and said leveling roller pin opening in said leveling link.

* * * * *